US006124600A

United States Patent [19]

Moroishi et al.

[11] Patent Number: 6,124,600

[45] Date of Patent: Sep. 26, 2000

[54] ULTRAVIOLET IRRADIATION DEVICE OF THE OPTICAL PATH DIVISION TYPE

[75] Inventors: Koutaro Moroishi, Kawasaki; Tarou Hayashi, Sagamihara, both of Japan

[73] Assignee: Ushiodenki Kabushiki Kaisha, Tokyo, Japan

[21] Appl. No.: 09/079,154

[22] Filed: May 15, 1998

[30] Foreign Application Priority Data

May 27, 1997 [JP] Japan .................................... 9-136671
Feb. 5, 1998 [JP] Japan .................................. 10-024475

[51] Int. Cl.[7] ........................................ G01J 1/00

[52] U.S. Cl. .................................. 250/504 R; 250/492.1; 250/493.1; 250/494.1

[58] Field of Search ............................ 250/504 R, 492.1, 250/493.1, 494.1

[56] References Cited

U.S. PATENT DOCUMENTS 4,048,490 9/1977 Troue .................................. 240/41.35
5,502,310 3/1996 Niestrath et al. .................... 250/492.1
5,932,886 8/1999 Arai et al. ........................... 250/504 R

FOREIGN PATENT DOCUMENTS 0 265 939 5/1988 European Pat. Off. .
2 348 347 4/1974 Germany .

*Primary Examiner*—Bruce C. Anderson
*Assistant Examiner*—Nikita Wells
*Attorney, Agent, or Firm*—Nixon Peabody LLP; David S. Safran

[57] ABSTRACT

An ultraviolet irradiation device of the optical path division type for treating a workpiece which is often subject to deformations and color changes due to heat, and in which the distribution of radiance is good and the average irradiance on the surface irradiated with light can be increased which can be achieved with light emitted from a rod-shaped lamp and reflected by a trough=shaped cold mirror being incident in cold mirrors which split the optical path. This light is thus divided into two parts and is incident in total reflection mirrors. On the other hand, the direct light emitted by the rod-shaped lamp is incident in second optical path splitting cold mirrors which divides this light and causes it to be incident in the total reflection mirrors. The light reflected by the total reflection mirrors is incident in heat reflection filters, and is transmitted by the heat reflection filters so as to be radiated onto a workpiece. On the workpiece the light divided into two parts is radiated such that the two beams of light come to lie partially superimposed one on top of the other. This improves the radiance distribution. Furthermore, light shielding components can also be used instead of the second optical path splitting mirrors.

8 Claims, 8 Drawing Sheets

ULTRAVIOLET IRRADIATION DEVICE OF THE OPTICAL PATH DIVISION TYPE

BACKGROUND OF THE INVENTION

1. Field of the Invention

The invention relates to an ultraviolet irradiation device which is used for ultraviolet radiation bonding of an article to be treated which is often subject to changes such as deformations, color changes due to heat and the like, or for curing of inks and the like, the above described article being defined as plastic, thermal paper, liquid crystal and the like. The invention relates especially to an ultraviolet irradiation device of the optical path division type, by which a good distribution of illuminance is obtained on the surface of the article to be treated which is irradiated with light and in which the average illuminance is high.

2. Description of Related Art

The device shown in FIG. 9 was proposed by the present inventor and another as an ultraviolet irradiation device which can treat an article (hereinafter called a "workpiece") which is often subject to deformations and color changes due to heat without using a cooling means. This drawing and a full description thereof can be found in commonly assigned, co-pending U.S. patent application Ser. No. 08/822,944, and as such, the "Prior Art" legend should not be viewed as an admission that this device is prior art with respect to this application within the meaning of the U.S. patent laws.

In FIG. 9, a cage-like body 10 of an ultraviolet irradiation device is shown within which a rod-shaped high pressure mercury lamp 11 is provided. Some of the light emitted from rod-shaped lamp 11 is incident upon a trough-shaped cold mirror 12, while the other part thereof is incident in plate-shaped cold mirrors 14, 15. Of the light which is incident upon the trough-shaped cold mirror 12, some of the visible radiation and infrared light is transmitted by the trough-shaped cold mirror 12, and the ultraviolet light (including some of the visible radiation and infrared light) is reflected by the trough-shaped cold mirror 12 and is incident upon the plate-shaped cold mirror 14. The light reflected thereby is incident upon a heat reflection filter 13 from which some of the visible radiation is reflected while the rest of the light is incident upon workpiece W.

On the other hand, of the light which was radiated by rod-shaped lamp 11 and which was incident directly in cold mirrors 14, 15, some of the visible radiation and infrared light is transmitted by cold mirrors 14, 15, while the ultraviolet light (including some of the visible radiation and infrared light) is reflected the plate-shaped cold mirrors 14, 15. The UV light reflected by plate-shaped cold mirrors 14, 15, furthermore, is incident in heat reflection filter 13, in which some of the visible radiation is reflected and the other light is incident on workpiece W.

By the measure that the reflection light from trough-shaped cold mirror 12 and the light projected directly by rod-shaped lamp 11 are reflected by cold mirrors 14, 15 and only the light reflected by the cold mirrors 14, 15 is radiated via heat reflection filter 13 onto workpiece W, the portions of infrared light and visible radiation can be relatively reduced and workpiece W can be irradiated with light which has a large proportion of ultraviolet radiation.

The above described ultraviolet irradiation device has the following shortcomings:

For effective use of the light from rod-shaped lamp 11, it is necessary for the light to be emitted parallel to cold mirror

14 or focused. The cross-sectional shape of trough-shaped cold mirror 12 is therefore oval or parabolic. The light reflected by the mirror with this cross-sectional shape has a distribution of the radiance on the irradiated surface which is in the form of a Gaussian distribution. The distribution of the radiance in the transverse direction of the rod-shaped lamp is therefore worse than the distribution of the radiance in the longitudinal direction.

In this poor distribution of radiance, and for a nonuniform distribution of the irradiance on the irradiated region, the following defects occur.

(a) Since in the irradiated area on the workpiece the treatment time is fixed based on the radiance at a minimum value, the workpiece treatment time becomes longer. In the case of a workpiece in which overcuring is not a problem, regardless of the radiance distribution, the treatment time can be reduced when the overall power is increased. But, it is necessary to increase the power supplied to the lamp, thus adversely affecting efficiency.

If the light power is not increased, the workpiece is treated within an irradiated region which has at least a certain radiance. However, the workpiece which can be treated must be made smaller.

(b) In the case of use, for example, for bonding a lens or for similar purposes, thermal distortion occurs due to the different absorption of UV radiation according to the locations where the bonding agent is applied, and stress-strain occurs due to a nonuniform curing reaction if the radiance distribution is nonuniform.

The correct above described defects, for example, the following measures can be considered:

(1) The distance between the lamp and irradiated surface of the workpiece is increased.

(2) The mirror and filter have a scattering function. For example, the surface/back of heat reflection filter 13 is sand blasted or slight dimpling or trough-shaped cold mirror 12 is provided, so that a formation like the surface of a golf ball is obtained. Or trough-shaped cold mirror 12/cold mirror 14 is formed as a polyhedron.

In case (1), the irradiance on the workpiece surface is reduced and the treatment time is lengthened. Furthermore, the entire system including the transport system, and thus the space occupied by the treatment device, becomes large.

In case (2), with sandblasting, the irradiance and thus the efficiency is reduced. Furthermore, for the slight dimpling or in the formation of a polyhedron, for light emergence with high efficiency and also to improve the irradiance, the construction of the form and the arrangement is difficult.

SUMMARY OF THE INVENTION

The present invention was intended to eliminate these defects. Thus, primary objects of the invention are to devise an ultraviolet irradiation device of the optical path division type which can treat a workpiece which is often subject to deformations and color changes due to heat without using a cooling means, in which the distribution of irradiance is good and the average irradiance on the surface irradiated with light can be increased.

The above described objects are achieved in accordance with the present invention by the following measures:

(1) In an ultraviolet irradiation device which comprises:

a rod-shaped lamp, a trough-shaped cold mirror which is located parallel to the direction of the major axis of the rod-shaped lamp and which reflects some of the radiant light from the rod-shaped lamp, mirrors for splitting the optical path which comprise at least two cold mirrors which divide the light emitted from the rod-shaped lamp into two parts and which reflect the light divided into two parts in different directions, two total reflection mirrors which each reflect the light divided by the mirrors for splitting the optical path into two parts, heat reflection filters which transmit the light reflected by the total reflection mirrors, the mirrors for splitting the optical path, the total reflection mirrors and the heat reflection filters are arranged such that, of the light emitted from the rod-shaped lamp, only the light which was divided by the mirrors for splitting the optical path into two parts and which passed through the heat reflection filters is radiated onto the surface to be irradiated with light partially on top of one another.

(2) The objects are, furthermore, achieved in accordance with the invention by arranging the light shielding plates in measure (1) such that the light emitted from the rod-shaped lamp is not directly emitted onto the heat reflection filter. As the light shielding plates, both plates which absorb the incident light and also plates which reflect the incident light can be used.

By using reflection plates as light shielding plates and by reflection of the incident light in the direction to the trough-shaped cold mirror, the energy of the light emitted from the rod-shaped lamp can be effectively used. Furthermore, by the measure that the arc-shaped reflection plates are formed around the tube axis of the rod-shaped lamp, the light incident in the reflection plates can be focused in the vicinity of the rod-shaped lamp, and thus, the radiant energy can be used more effectively.

(3) Furthermore, the objects are achieved in accordance with the invention by the mirrors for splitting the optical path in measures (1) and (2) being comprised of first mirrors for splitting the optical path, which divide the light reflected by the trough-shaped cold mirror and emitted by the rod-shaped lamp into two parts and reflect them in different directions, and of second mirrors for splitting the optical path, which divide the light emitted directly by the rod-shaped lamp into two parts and reflect them in different directions, and by the total reflection mirrors being arranged such that the light reflected by the first mirrors for splitting the optical path and the light reflected by the second mirrors for splitting the optical path are reflected.

(4) The objects also achieved in accordance with the invention by the trough-shaped cold mirror in measures (1), (2), and (3) being provided with trough-openings and by means of cooling air which flows in from these trough-openings, at least the rod-shaped lamp, the trough-shaped cold mirror, the mirrors for splitting the optical path and the heat reflection filter are cooled.

(5) The objects are achieved in accordance with the present invention, additionally, by installing light shielding components on the backs of the mirrors, in measure (4), for splitting the optical path. Furthermore, the mirrors for splitting the optical path and the light shielding components can form trough-openings for cooling the mirrors used for splitting the optical path by routing cooling air into them.

In accordance with the invention, the light emitted from the rod-shaped lamp is divided into two parts by cold mirrors used for splitting the optical path into two paths, as was described above. The light divided into two parts is transmitted by the heat reflection filters and comes to lie in part on one another on the surface irradiated with the light. Therefore, the distribution of irradiance on the surface irradiated with the light can be made uniform.

Furthermore, by the measure that the light emitted from the rod-shaped lamp is divided into two optical paths and is reflected by the two mirrors for splitting the optical path and the total reflection mirrors, the distance between the lamp and the surface irradiated with light can be shortened, because the light is frequently reflected. In this way, the size of the entire device can be reduced.

Also, in accordance with the invention, the arrangement of the light shielding plates which reflect or absorb the light can reliably present the light emitted by the rod-shaped lamp from being directly incident on the heat reflection filters. In particular, by the measure that reflection plates are used as light shielding plates, the energy of the light emitted by the rod-shaped lamp can be effectively used.

With the measure according the invention by which the mirrors for splitting the optical path are comprised of the first mirrors for splitting the optical path and the second mirrors for splitting the optical path, the energy of the light emitted by the rod-shaped lamp can be effectively used, and thus, the irradiance on the surface irradiated with the light can be intensified.

By the measure in which a cooling system is formed, the rod-shaped lamp, the trough-shaped cold mirrors, the mirrors for splitting the optical path and the heat reflection filters and the like can be effectively cooled.

These and further objects, features and advantages of the present invention will become apparent from the following description when taken in connection with the accompanying drawings which, for purposes of illustration only, show several embodiments in accordance with the present invention.

DETAILED DESCRIPTION OF PREFERRED EMBODIMENTS

Figure 1:
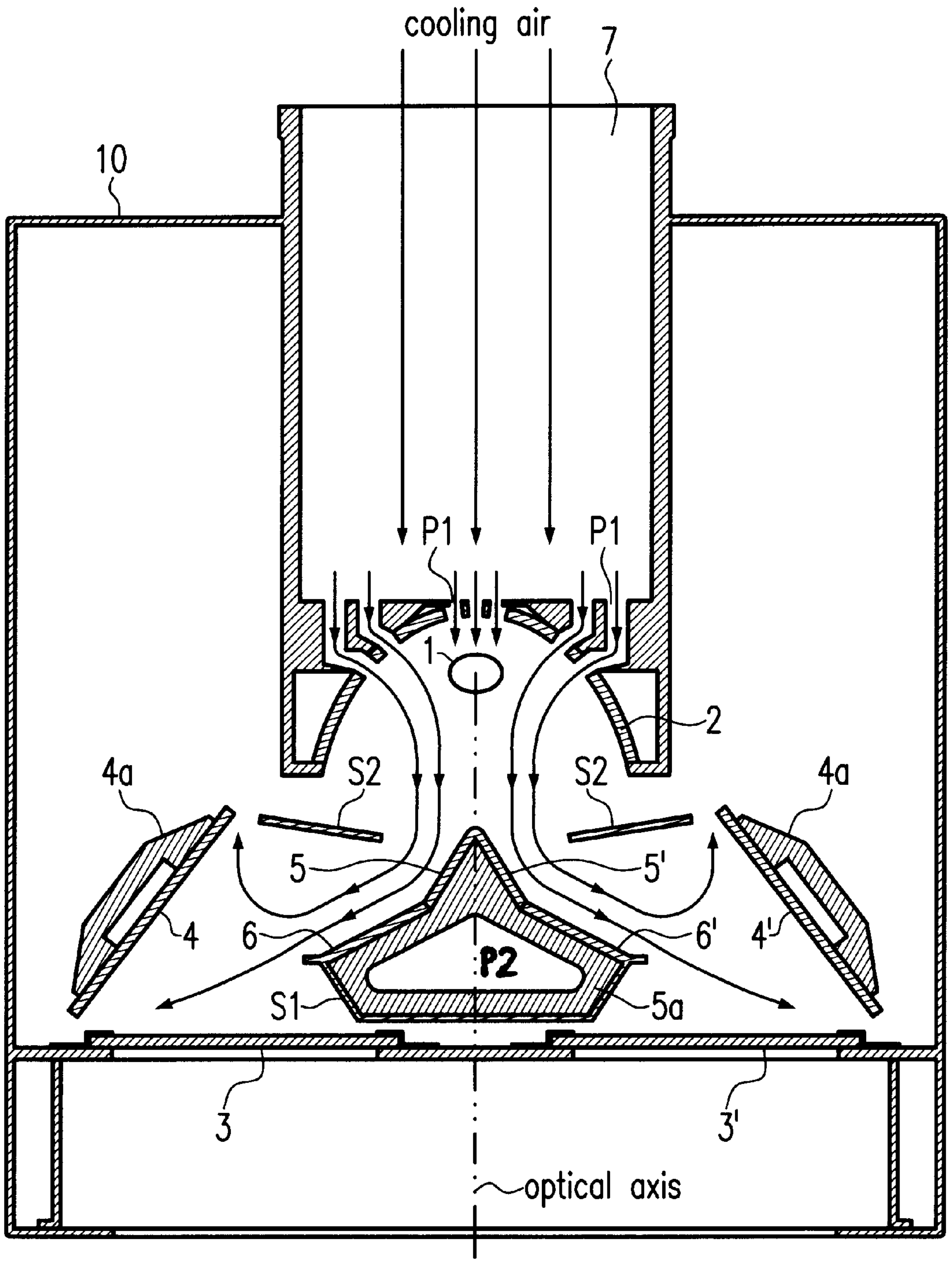
FIG. 1 is a cross-sectional view schematically showing the arrangement of a first embodiment of an ultraviolet irradiation device in accordance with the invention.
Figure 2:
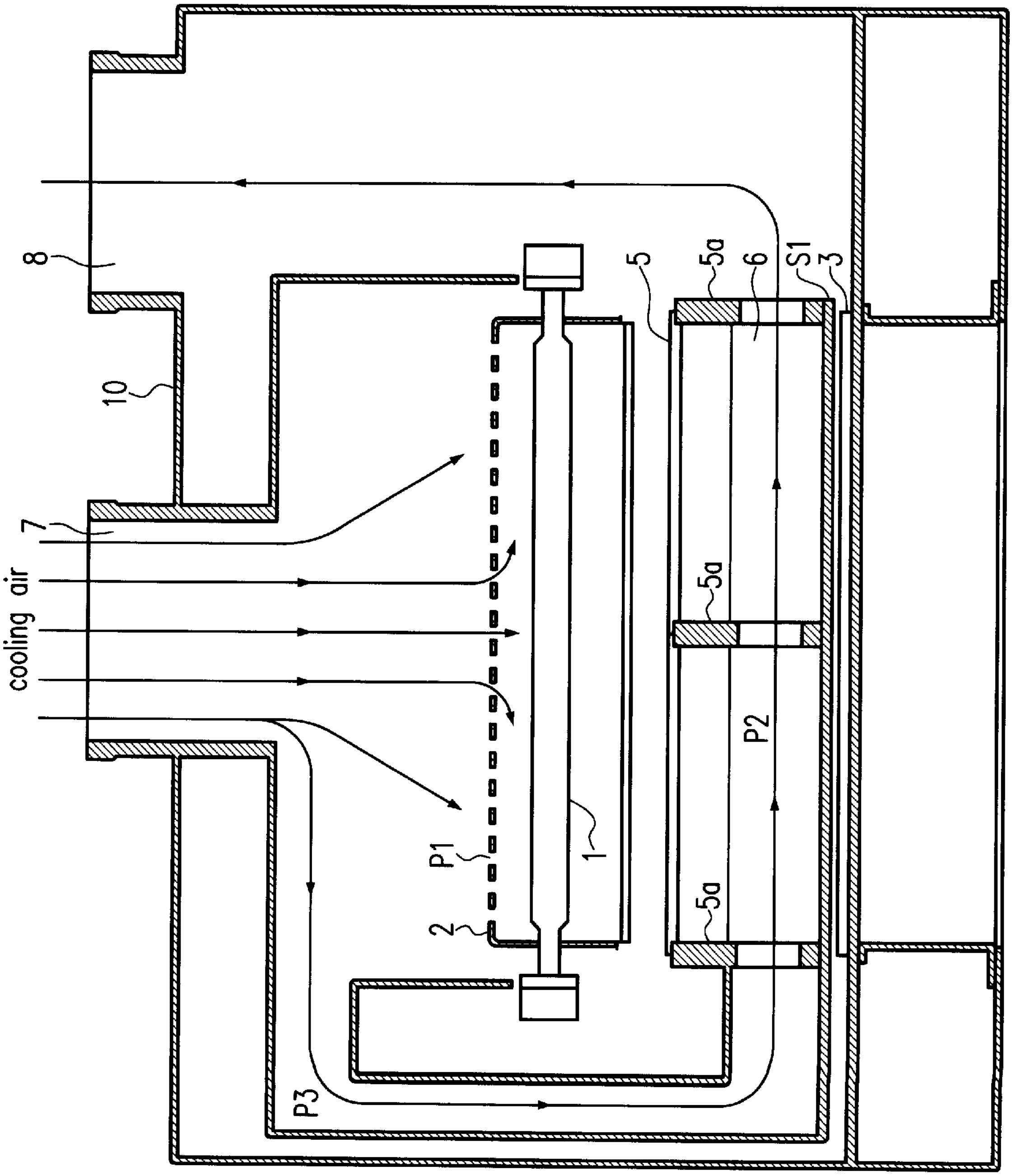
FIG. 2 shows the first embodiment of the ultraviolet irradiation device in a cross-sectional view taken in a center plane that is at a right angle to the sectional plane of FIG. 1.

FIGS. 1 and 2 show an arrangement according to a first embodiment of an ultraviolet irradiation device in accordance with the present invention. FIG. 1 shows the ultraviolet irradiation device in a cross section in a plane perpendicular to the tube axis of a rod-shaped UV lamp 1. FIG. 2 shows this embodiment in a cross section in a plane which passes through the tube axis and runs along the optical axis shown in FIG. 1.

Rod-shaped lamp 1 is, for example, a high pressure mercury lamp, a metal halide lamp or the like, which emits light which contains UV radiation. Furthermore, it is housed in a trough-shaped cold mirror 2 which is made of glass or the like and which is provided with a vacuum evaporation film that reflects UV light and some of the visible radiation while transmitting other light. Trough-shaped cold mirror 2 is provided with several air injection passages P1. The cooling air blown in from air injection channel 7 flows via air injection passages P1 into the trough-shaped cold mirror 2 along the flow paths shown by the arrows in FIG. 1.

Total reflection mirrors 4, 4' are formed of aluminum sheets or the like which have surfaced that have been polished to a high sheen. Total reflection mirrors 4, 4' reflect light almost in the entire wavelength range, for example, UV light, visible radiation and the like. Total reflection mirrors 4, 4' are, as shown in FIG. 1, located on opposite sides of the trough-shaped cold mirror 2 and are each supported by supporting component 4*a*. Furthermore, the total reflection mirrors 4, 4' are installed such that their angles can be adjusted so that the distribution of irradiance can be regulated.

First mirrors 5, 5' are provided for splitting the optical path, and like trough-shaped cold mirror 2, are made of glass or the like which is provided with a vacuum evaporation film which reflects UV light and some of the visible radiation but transmits other light. As is shown in FIG. 1, the first mirrors 5, 5' comprise two mirrors which meet each other at an acute angle forming an inverted V-shape arranged symmetrically relative to the optical axis. Furthermore, second mirrors 6, 6' for splitting the optical path comprise cold mirrors like the first mirrors 5, 5' for splitting the optical path, and as illustrated in FIG. 1, they are arranged symmetrically with respect to the optical axis, extending at an obtuse angle from an edge of a respective one of the first mirrors 5, 5'.

First and second mirrors 5, 5' & 6, 6' for splitting the optical path are installed on the top side of a holding component 5*a* which has a projection in the upper area and an essentially triangular opening in its middle area. On the bottom sides and on the bottom of component 5*a* there is a light shielding component S1 which is used for shielding (for absorbing) the visible radiation and the infrared light which has been transmitted by the first and second mirrors 5, 5', 6, 6'. The first and second mirrors 5, 5', 6, 6' together with the light shielding component S1 form a modified heptagonal column having an upward projection in which an air injection passage P3 is formed for the passage of cooling air, as is shown in FIG. 2.

First and second mirrors 5, 5', 6, 6' for splitting the optical path are, furthermore, installed for preventing the deterioration of light efficiency with angles by which reflection of the light does not take place in the direction to trough-shaped cold mirror 2.

Figure 3:
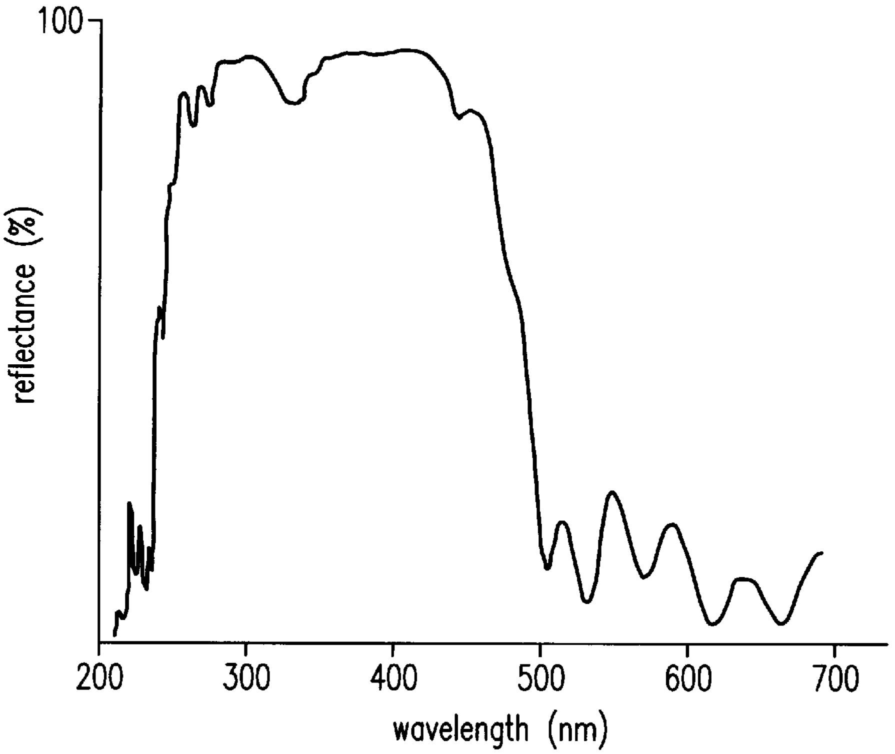
FIG. 3 is a graph showing an example of the spectral reflectance of cold mirrors as a function of wavelength.

FIG. 3 is a schematic of one example of the spectral reflectance of the trough-shaped cold mirror 2 and the mirrors 5, 5', 6, 6' for splitting the optical path. As this figure shows, these cold mirrors 2, 5, 5', 6, 6' reflect light having wavelengths of roughly 200 nm to 500 nm and transmit part of the visible radiation and the infrared light.

In FIGS. 1 and 2, the ultraviolet irradiation device is shown as having a cage-shaped body 10 having a bottom provided with an opening. Between this opening and the first and second mirrors 5, 5' & 6, 6', there are two heat reflection filters 3, 3' which are made of glass or the like provided with a vacuum evaporation film which transmits UV light, reflects visible radiation and absorbs some of the infrared light.

Furthermore, between the total reflection mirrors 4, 4' and the first optical path splitting mirrors 5, 5', there are light shielding plates S2 for absorbing the incident light and which shield the heat reflection filters 3, 3' from the light emitted form the rod-shaped lamp 1.

Figure 4:
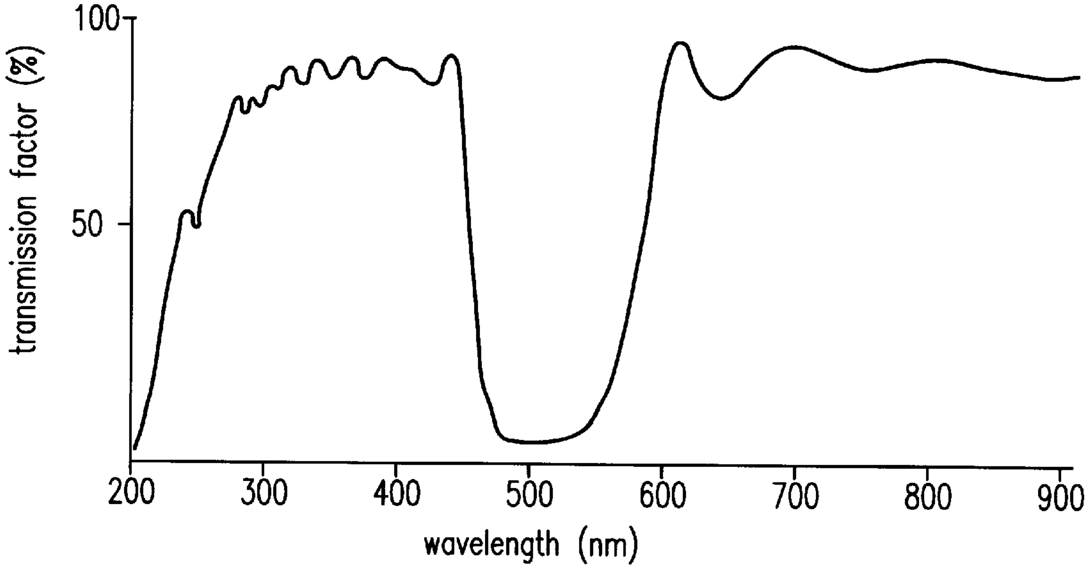
FIG. 4 is a graph showing an example of the spectral transmission factor of the heat reflection filters as a function of wavelength.

FIG. 4 is a schematic of one example of the spectral transmission factor of heat reflection filters 3, 3' which transmit light of wavelengths of roughly 200 nm to 450 nm and which reflect visible radiation having wavelengths of roughly 450 nm to 600 nm, as becomes apparent from the drawings.

In FIGS. 1 & 2, cooling of the rod-shaped lamp 1, trough-shaped cold mirror 2, heat reflection filters 3, 3', first and second optical path splitting mirrors 5, 5, 6, 6' and the like is obtained in the manner described below.

The cooling air blown in through air injection channel 7 passes trough-shaped cold mirror 2 via the air injection passages P1 located in it, is blown directly onto rod-shaped lamp 1, cools rod-shaped lamp 1, and at the same time, trough-shaped cold mirror 2.

Furthermore, this cooling air travels along the flow paths, shown by the arrows in FIGS. 1 % 2, cooling the first and second mirrors 5, 5, 6, 6' and the heat reflection filters 3, 3', then passing through the intermediate spaced between the total reflection mirrors 4, 4' and the light shielding component S1, and the intermediate spaces between the heat reflection filters 3, 3' and the light shielding component S1, as is shown in FIG. 1. The cooling flows then pass into the spaces on either side of the total reflection mirrors 4, 4', pass through these spaces and then are discharged to the outside by means of the air exit channels 8 shown in FIG. 2.

Part of the cooling air blown in through air injection channel 7 passes through air injection passage P3 (FIG. 2), is blown into the air injection passage P2, cools first and second optical path splitting mirrors 5, 5, 6, 6' and light shielding component S1, and is then discharged to the outside via air exit channel 8.

Figure 5:
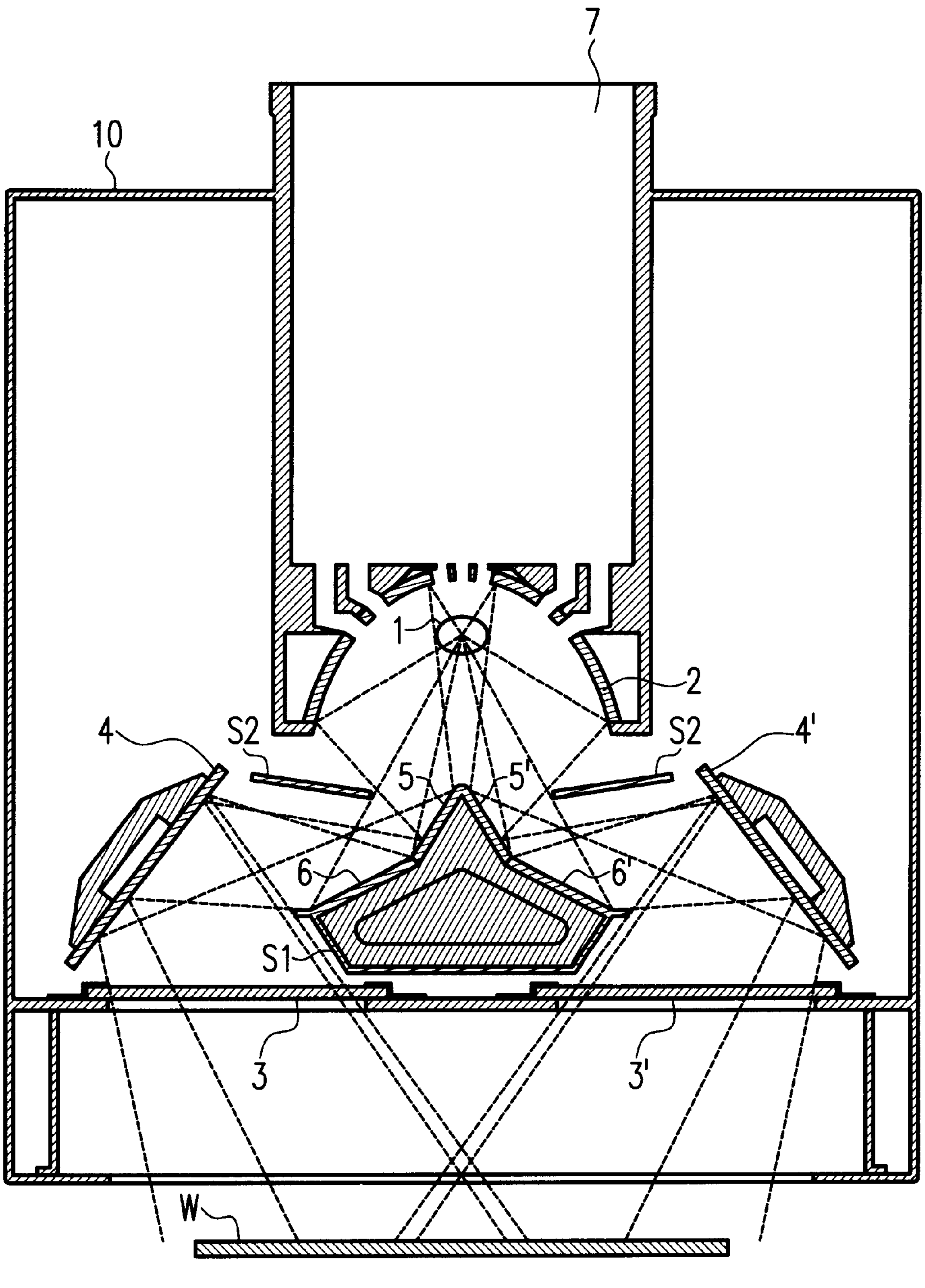
FIG. 5 shows a schematic of the optical paths for the first embodiment of the ultraviolet irradiation device.

FIG. 5 is a schematic of the optical paths that are traversed by the light emitted by the rod-shaped lamp 1 in the ultraviolet irradiation device in this embodiment. In this figure, some of the light emitted by rod-shaped lamp 1 is incident in trough-shaped cold mirrors 2, while another part thereof is incident directly in the first and second mirrors 5, 5, 6, 6' and in light shielding plates (light absorption plates) S2. The light incident in light shielding plates (light absorption plates) S2 is absorbed in light shielding plates (light absorption plates) S2.

Trough-shaped cold mirror 2 has the spectral reflectance shown above using FIG. 3. Of the light incident in trough-shaped cold mirror 2, some of the visible radiation and infrared light is transmitted by the trough-shaped cold mirror 2, while the UV light (including some of the visible radiation and infrared light) is reflected by the trough-shaped cold mirror 2, is incident in first mirrors 5, 5' and is divided into two parts.

The first optical path splitting mirrors 5, 5' have the same spectral reflectance as the trough-shaped cold mirror 2. Some of the visible radiation and infrared light is transmitted by the first mirrors 5, 5', while the UV light (including some of the visible radiation and infrared light) is reflected. The light divided by the first optical path splitting mirrors 5, 5' is incident in the total reflection mirrors 4, 4' and is reflected so as to be incident in the heat reflection filters 3, 3'.

On the other hand, the second optical splitting mirrors 6, 6' have the same spectral reflectance as the trough-shaped cold mirror 2. Of the light emitted by rod-shaped lamp 1 and incident directly in the second mirrors 6, 6', some of the visible radiation and infrared light is transmitted by the second mirrors 6, 6', while the UV light (including some of the visible radiation and infrared light) is reflected by the second optical path splitting mirrors 6,6', and is incident in the total reflection mirrors 4, 4'60 which reflects the light so that it is incident in heat reflection filters 3, 3'.

Heat reflection filters 3, 3' have the spectral transmission factor shown in FIG. 4. Of the light incident in heat reflection filters 3, 3', some of the visible radiation is reflected, while the other light is transmitted by heat reflection filter 3 and is incident in the area to be irradiated on which workpiece W is placed.

Some of the direct light which is emitted by the rod-shaped lamp 1 is shielded by the light shielding plates (light absorption plates) S2. The direct light emitted by the rod-shaped lamp 1 is, therefore, not incident in the heat reflection filters 3, 3'. Furthermore, some of the light from rod-shaped lamp 1 which is incident directly in the first mirrors 5, 5' and was reflected, is incident in the total reflection mirrors 4, 4' which reflect the light so that it is incident in the area to be irradiated via heat reflection filters 3, 3'. On the other hand, the other light is emitted into the intermediate spaces between the total reflection mirrors 4, 4' and the heat reflection filters 3, 3', and is absorbed by the wall surface of the cage-shaped body of ultraviolet irradiation device 10. At the same time, part of the light passes through the heat reflection filters 3, 3' and is absorbed by the wall surface of the cage-shaped body of ultraviolet irradiation device 10.

As was described above, in this embodiment, the light emitted by the rod-shaped lamp 1 travels via the above described optical paths onto workpiece W.

(1) The light reflected by the trough-shaped cold mirror 2 and emitted by the rod-shaped lamp 1 is incident in the first optical path splitting mirrors 5, 5', is divided into two parts, reflected by total reflection mirrors 4, 4', is incident in heat reflection filters 3, 3' and is emitted via the heat reflection filters 3, 3' from two directions onto workpiece W.

(2) The direct light emitted by the rod-shaped lamp 1 is incident in the second optical path splitting mirrors 6, 6', is divided into two parts, is reflected by the total reflection mirrors 4, 4', is incident in the heat reflection filters 3, 3' and is emitted via heat reflection filters 3, 3' from two directions onto workpiece W.

In this embodiment, the light emitted by the rod-shaped lamp 1 is reflected at least once by the cold mirror and is incident in heat reflection filters 3, 3'. Only the light which has been transmitted by the heat reflection filters 3, 3' is emitted onto the workpiece W. Therefore, of the light emitted by the rod-shaped lamp 1, the visible radiation and infrared light can be cut and only the UV light emitted onto the workpiece W.

Furthermore, light is emitted onto workpiece W from two directions, and a portion of the light from each direction comes to rest on one another on the workpiece W. Therefore, the distribution of the irradiance can be improved.

Figure 6:
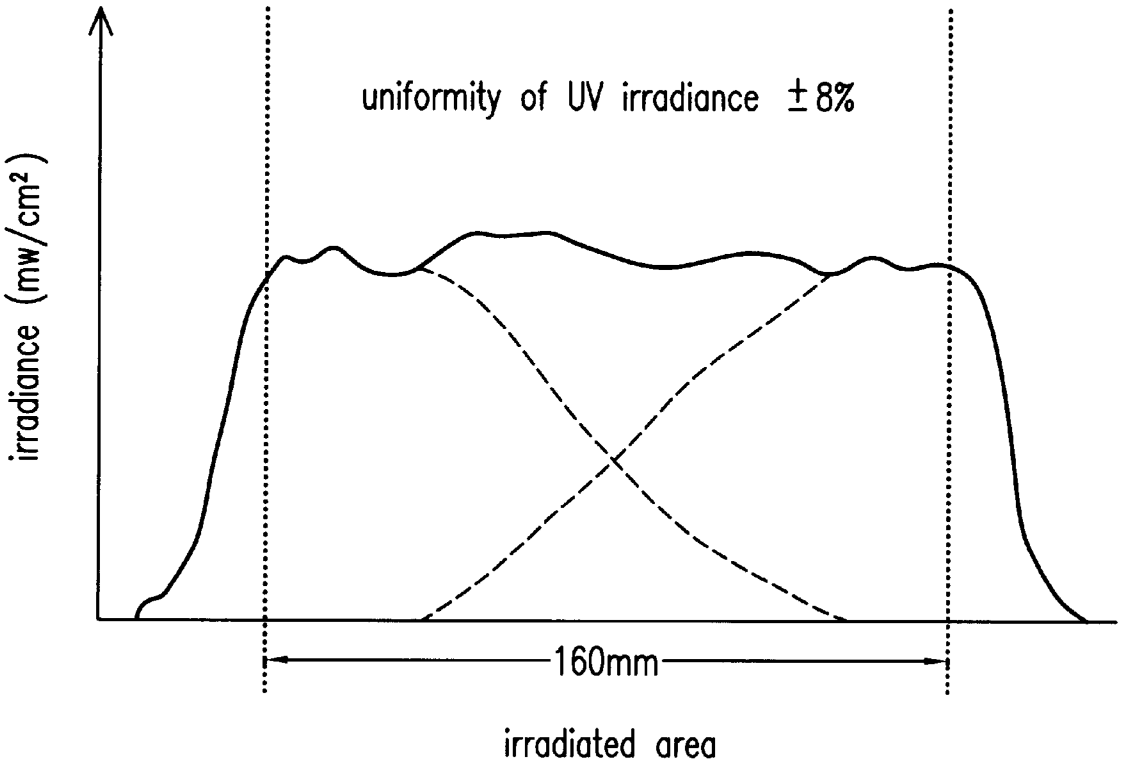
FIG. 6 shows a schematic of the distribution of the irradiance in the irradiated area with the first embodiment.

FIG. 6 is a schematic of one example of the distribution of irradiance on the irradiated area using the ultraviolet irradiation device in this embodiment. In this figure, the x-axis plots the positions across the workpiece as shown in FIG. 5 and the y-axis plots the irradiance of the UV light. The broken lines represent the respective distribution of the irradiance of the light divided into two parts, while the solid line represents the distribution of irradiance when these two parts are superimposed on one another.

As is apparent from the drawing, the uniformity of the irradiance distribution in the irradiated area of light with 160 nm wavelength is roughly ±8% in the ultraviolet irradiation device of this embodiment. This uniformity as compared to the conventional irradiance distribution in the form of a Gaussian distribution represents a significant increase.

Figure 7:
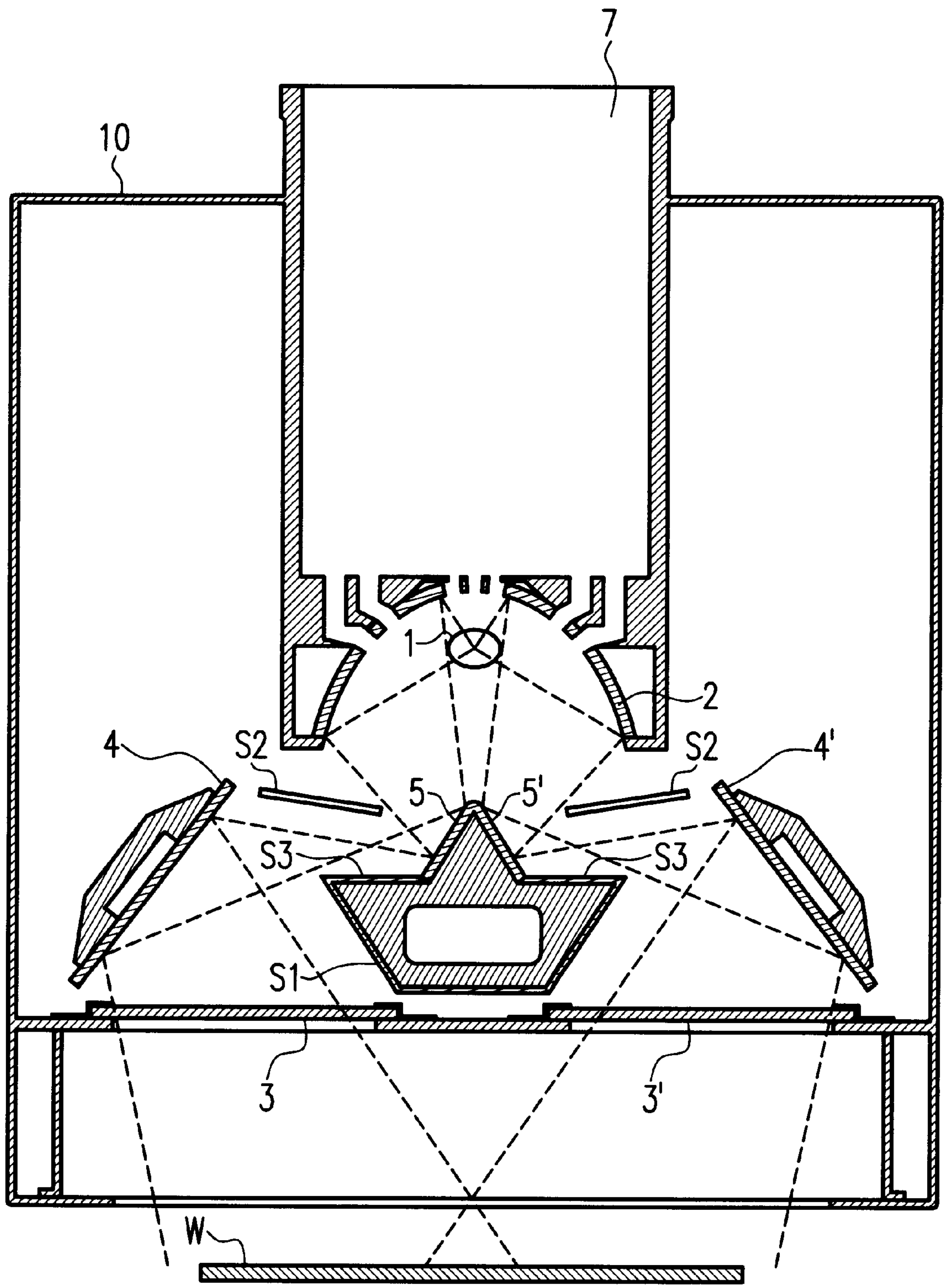
FIG. 7 is a view similar to that of FIG. 1, but showing a second embodiment of the invention.

FIG. 7 is a schematic of a second embodiment of the invention. In this embodiment, instead of the second mirrors for splitting the optical path 6, 6' shown in the first embodiment light shielding components S3 are used for absorbing the light and only the reflection light is used by the first mirrors for splitting optical path 5, 5'.

In FIG. 7, parts that are the same as parts in FIGS. 1, 2 and 5 are provided with the same reference numbers. In this embodiment, instead of the second optical path splitting mirrors 6, 6', there are light shielding components S3 which are similar to the shielding components S1 described above.

Also in this embodiment, the light emitted by rod-shaped lamp 1 is emitted onto the workpiece on the routing paths described below.

Some of the light emitted by rod-shaped lamp 1 is incident in the trough-shaped cold mirror 2, while another part thereof is incident in first optical path splitting mirrors 5, 5', light shielding plates (light absorption plates) S2 and light shielding components S3. The light incident in the light shielding plates (light absorption plates) S2 and the light shielding components S3 is absorbed by the light shielding plates (light absorption plates) S2 and light shielding components S3.

Of the light which is incident in the trough-shaped cold mirror 2, some of the visible radiation and the infrared light is transmitted by the trough-shaped cold mirror 2, while the UV light is reflected by the trough-shaped cold mirror 2, is incident in the first optical path splitting mirrors 5, 5' (which are cold mirrors), and is divided into two parts. The light divided into two parts is incident in total reflection mirrors 4, 4' and is reflected light so as to be incident in the heat reflection filters 3, 3'. Furthermore, the light which was emitted by rod-shaped lamp 1, was incident directly in the first mirrors 5, 5' and which was reflected, is absorbed by light shielding components S3.

This means that, in this embodiment, the light emitted by rod-shaped lamp 1 is reflected by the first optical path splitting cold mirrors 5, 5', is incident in the heat reflection filters 3, 3' and only the light transmitted by the heat reflection filters 3, 3' is radiated onto workpiece W. Therefore, as in the first embodiment, only the UV light in which the visible radiation and infrared light were cut can be radiated onto the workpiece W. Furthermore, the illuminance distribution can be improved because light is emitted onto workpiece W from two directions and the light from each of the directions comes to lie on workpiece W partially superimposed on top of one another.

In this embodiment, the direct light emitted by rod-shaped lamp 1 cannot be used because there are no second mirrors 6, 6' for splitting the optical path, by which light efficiency is slightly reduced as compared to the light efficiency in the first embodiment. But, in this embodiment, the light emitted from rod-shaped lamp 1 is incident completely, via trough-shaped cold mirror 2 and first optical path splitting mirrors 5, 5', in heat reflection filters 3, 3'. Therefore, compared to the first embodiment, the value which is computed as (radiation energy of the UV light)/(total light radiation energy) can be increased.

In the first and second embodiments, the light is absorbed by light shielding plates (light absorption plates) S2. The energy of the light emitted by the rod-shaped lamp in a certain angular range therefore remains unused. In the third embodiment described below, instead of light shielding plates (light absorption plates) S2, shielding/reflection plates M are used. Here, the light absorbed is by the light shielding (absorption) side of plates M which faces away from cold mirror 2 and is reflected on the side of the plates M which faces the trough-shaped cold mirror 2, so that the energy of the light emitted by rod-shaped lamp 1 is used more effectively.

Figure 8:
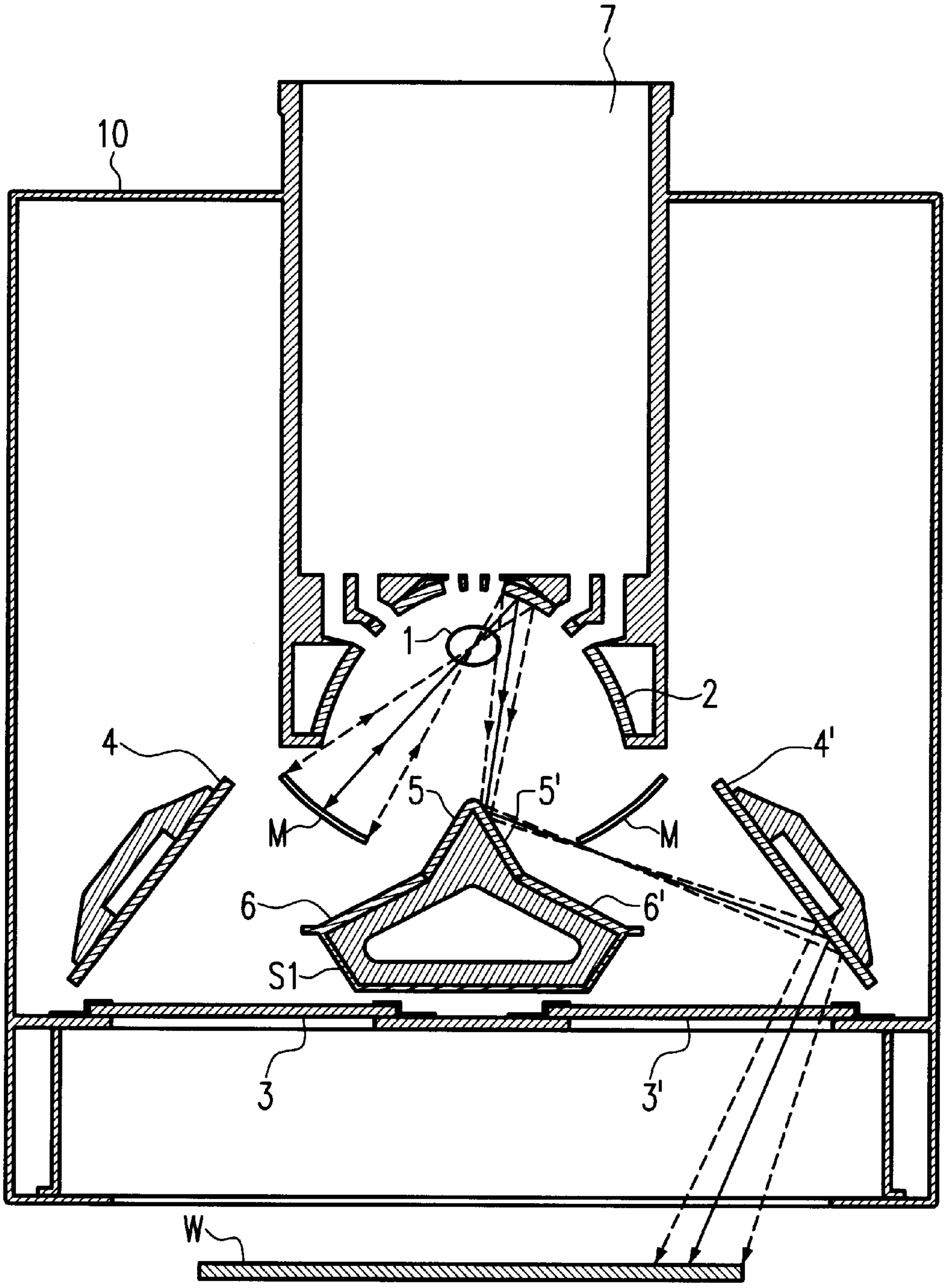
FIG. 8 is a view similar to that of FIG. 1, but showing a third embodiment of the invention.
Figure 9:
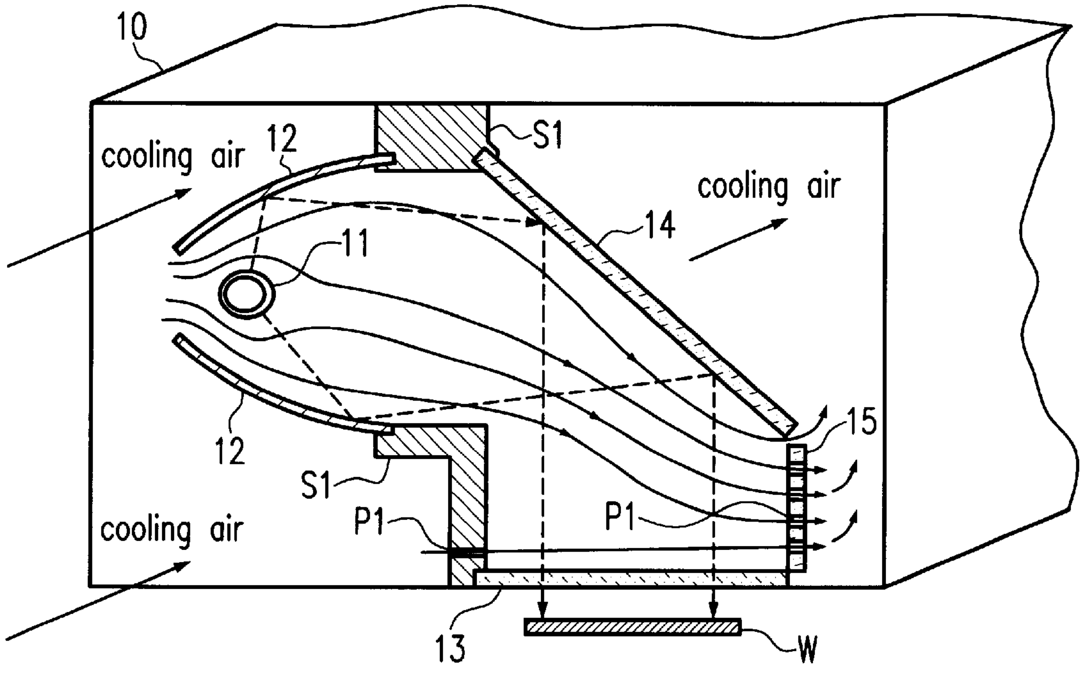
FIG. 9 (Prior Art)
FIG. 9 shows an ultraviolet irradiation device in accordance with a prior application of one of the present inventors.

FIG. 8 is a schematic of the third embodiment of the invention. Here, parts that are the same as in the embodiments of FIGS. 1, 2, and 5 are provided with the same reference numbers. In this embodiment, instead of light shielding (light absorption) plates S2, reflection plates M, which are are shaped, are provided as was described above. The side of plates M facing the rod-shaped lamp 1 are total reflection mirrors formed of aluminum sheets or the like with surfaces which are polished to a high sheen. They reflect light almost in the entire wavelength range, for example, UV light, visible radiation and the like.

In this embodiment, the emission paths of the light emitted by the rod-shaped lamp 1, with the exception of the light incident in reflection plates M, are the same as in the first embodiment. The irradiation of the workpiece is produced on the following emission paths.

Some of the light emitted from the rod-shaped lamp 1 is incident in trough-shaped cold mirror 2, while another part is directly incident in first and second optical path splitting mirrors 5, 5', 6, 6' and reflection plates M. Of the light which is incident in the trough-shaped cold mirror 2, some of the visible radiation and infrared light is transmitted by the trough-shaped cold mirror 2, and the UV light is reflected by the trough-shaped cold mirror 2, is incident in first optical path splitting cold mirrors 5, 5', and is divided into two parts. The light divided into two parts is incident in total reflection mirrors 4, 4' with the light then reflected being incident in heat reflection filters 3, 3'.

Of the light which was radiated by rod-shaped lamp 1 and which was incident directly in the second optical path splitting mirrors 6, 6', some of the visible radiation and infrared light is transmitted by the second optical path splitting mirrors 6, 6', while the UV light is reflected by the two second optical path splitting mirrors 6, 6' and is incident in the total reflection mirrors 4, 4', with light then reflected being incident in heat reflection filters 3, 3'.

On the other hand, the light radiated from the rod-shaped lamp 1 which is incident in the arc-shaped reflection plates M is reflected by the reflection plates M and is incident in the trough-shaped cold mirror 2, as is illustrated in FIG. 8. Here, the reflection plates M are formed to be essentially arc-shaped around the tube axis of rod-shaped lamp 1. The light reflected by reflection plates M is therefore reflected again in a direction toward the middle of rod-shaped lamp 1, passes essentially through the middle of rod-shaped lamp 1 and is incident in the trough-shaped cold mirror 2.

The light reflected by the trough-shaped cold mirror 2, as was described above, is incident in the first and second optical path splitting mirrors 5, 5', & 6, 6', is reflected by each, and is incident in the heat reflection filters 3, 3'.

Furthermore, the shape of reflection plates M can also be plate-shaped. But, by means of the arc shape shown in FIG. 8, the light incident in the reflection plates M can be focused in the vicinity of the rod-shaped lamp 1 and the energy of the light emitted by rod-shaped lamp 1 can be used even more efficiently.

As was described above, in this embodiment, by using reflection plates M instead of the light shielding plates S2, the energy of the light emitted from rod-shaped lamp 1 can be efficiently used. Furthermore, here, as in the first and second embodiments, the light emitted from rod-shaped lamp 1 can have the visible radiation and the infrared light cut from it so that only the UV light is irradiated onto the workpiece W.

ACTION OF THE INVENTION

As was described above, with the invention, the following effects can be achieved.

(1) By the measure that the light emitted from the rod-shaped lamp is divided into two parts by the optical path splitting mirrors, which are cold mirrors, is transmitted by to workpiece via the heat reflection filters, and that the light divided into two parts comes to lie partially superimposed on one another on the surface irradiated with the light, the distribution or irradiance on the surface irradiated with light can be made uniform and the average irradiance on the surface irradiated with light can be increased. Therefore, a workpiece which is often subject to deformations and color changes due to heat can be effectively used without using a cooling means. Furthermore, for bonding of a lens or the like, thermal distortion and stress-strain due to a nonuniform curing reaction is prevented.

(2) By the measure that the light emitted from the rod-shaped lamp is divided into two optical paths and is reflected by the two optical path splitting mirrors and the total reflection mirrors, the distance between the lamp and the surface irradiated with light can be shortened, because the light is frequently reflected. In this way, the size of the entire device can be reduced.

(3) By the measure that the mirrors for splitting the optical path are comprised of first optical path splitting mirrors and second optical path splitting mirrors, the light emitted by the rod-shaped lamp can be effectively used, and thus, the irradiance on the surface irradiated with light can be intensified.

(4) The arrangement of the light shielding plates which absorb or reflect light can reliably present the light emitted from the rod-shaped lamp from being directly incident in the heat reflection filters. Furthermore, by using reflection plates as light shielding plates, the energy of the light emitted from the rod-shaped lamp can be especially effectively used.

(5) By the arrangement of the cooling air passages in the trough-shaped cold mirror, cooling of at least the rod-shaped lamp, the trough-shaped cold mirror, the optical path splitting mirrors and the heat reflection filters can be achieved by the cooling air flowing in from these passages, by the arrangement of the light shielding components on the backs of the optical path splitting mirrors, by the formation of cooling passages within the supporting body for the optical path splitting mirrors and the light shielding components, efficient cooling of the optical path splitting mirrors, the rod-shaped lamp, the trough-shaped cold mirror, the heat reflection filters and the like can be achieved.

We claim:

1. Ultraviolet irradiation device of the optical path division type comprising:

a radiant light emitting, rod-shaped lamp having a major axis;

a trough-shaped cold mirror which reflects some of the radiant light from the rod-shaped lamp, said rod-shaped lamp being located with its major axis parallel to a longitudinal direction of the trough-shaped cold mirror;

optical path splitting mirrors for dividing the radiant light emitted from the rod-shaped lamp into parts directed in different directions, comprising at least two cold mirrors;

two total reflection mirrors, each of which reflects the part of the light from a respective one of the optical path splitting mirrors; and heat reflection filters which transmit the light reflected by the total reflection mirrors;

wherein the optical path splitting mirrors, the total reflection mirrors and the heat reflection filters are arranged such that, of the light emitted from the rod-shaped lamp, only the light which is divided by the optical path splitting mirrors and is passed through the heat reflection filters is radiated onto the surface to be irradiated with a portion of the light from each of the optical path splitting mirrors being superimposed one on top of the other.

2. Ultraviolet irradiation device as claimed in claim 1, wherein light shielding plates are arranged at a location preventing the light emitted from the rod-shaped lamp from being radiated directly onto the heat reflection filters.

3. Ultraviolet irradiation device as claimed in claim 2, wherein the light shielding plates are reflective on a side directed toward the trough-shaped cold mirror as a means for reflecting light incident thereon toward the trough-shaped cold mirror.

4. Ultraviolet irradiation device as claimed in claim 3, wherein the reflective side of the light shielding plates are concavely arc-shaped around the major axis of the rod-shaped lamp.

5. Ultraviolet irradiation device as claimed in claim 1, wherein each of the optical path splitting mirrors comprises a first optical path splitting mirror and a second optical path splitting mirror; and wherein each of the total reflection mirrors is arranged to reflect the part of the light reflected by a respective one of the first optical path splitting mirrors and by a respective one of the second optical path splitting mirrors.

6. Ultraviolet irradiation device as claimed in claim 1, wherein the trough-shaped cold mirror is provided with air passages for introducing cooling air therethrough to cool at least the rod-shaped lamp, the trough-shaped cold mirror, the optical path splitting mirrors, and the heat reflection filters.

7. Ultraviolet irradiation device as claimed in claim 6, wherein in an area of backs of the optical path splitting mirrors there are light shielding components.

8. Ultraviolet irradiation device as claimed in claim 7, wherein air passages are formed near the optical path splitting mirrors and the light shielding components for cooling the optical path splitting mirrors by introducing cooling air through said air passages.

* * * * *